United States Patent [19]
Kennedy et al.

[11] Patent Number: 5,562,201
[45] Date of Patent: Oct. 8, 1996

[54] CONVEYOR ASSEMBLY

[75] Inventors: Paul Kennedy, Lake Zurich, Ill.; Peter Schoenecker, Thief River Falls, Minn.

[73] Assignee: Tetra Laval Holdings & Finance S.A., Pully, Switzerland

[21] Appl. No.: 547,091

[22] Filed: Oct. 23, 1995

Related U.S. Application Data

[63] Continuation of Ser. No. 282,981, Jul. 29, 1994, Pat. No. 5,460,262.

[51] Int. Cl.⁶ .................................................. B65G 15/60
[52] U.S. Cl. ...................... 198/841; 198/803.15; 198/617
[58] Field of Search ..................... 198/803.14, 803.15, 198/837, 841, 617; 53/249, 250, 579

[56] References Cited

U.S. PATENT DOCUMENTS

| | | | |
|---|---|---|---|
| 2,957,289 | 10/1960 | Monroe et al. | |
| 3,675,759 | 7/1972 | Koppe | 198/803.14 |
| 3,708,059 | 1/1973 | Ackermann | 198/841 |
| 3,910,404 | 10/1975 | Henrekson | 198/841 |
| 4,927,006 | 5/1990 | Dolan | 198/841 |

*Primary Examiner*—Joseph E. Valenza
*Attorney, Agent, or Firm*—McAndrews, Held & Malloy Ltd.; Patrick N. Burkhart

[57] ABSTRACT

A conveyor system is set forth that includes a track having a generally linear section and a generally curved section. The track further includes a guide channel having sidewalls that engage a guide member that is in fixed positional alignment, for example, with a carrier and/or belt. The guide member engages the sidewalls of the guide channel to facilitate guided movement of the carrier and/or belt along the track. The guide member includes a linear portion that is engaged by the track when the guide member is disposed along the linear section of the track while being generally disengaged from the track when the guide member is disposed along the curved section of the track. The guide member further includes a curved section that engages the sidewalls of the guide channel when the guide member is disposed along the curved section of the track. The radius of curvature of the curved portion of the guide member generally coincides with the radius of curvature of the track about a curved portion of the track.

3 Claims, 5 Drawing Sheets

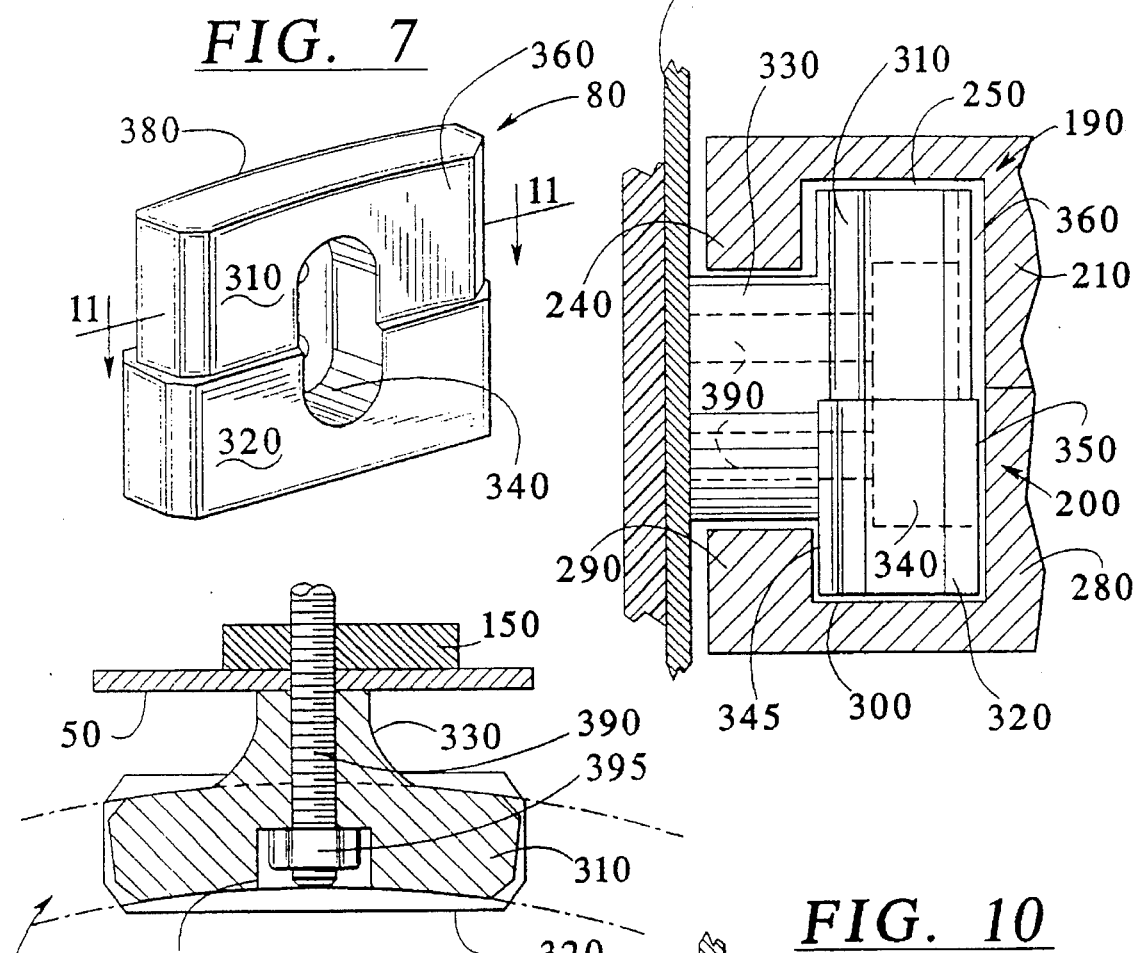
FIG. 7  FIG. 9
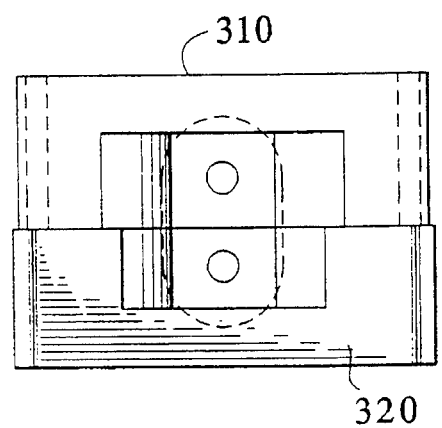
FIG. 11
FIG. 8
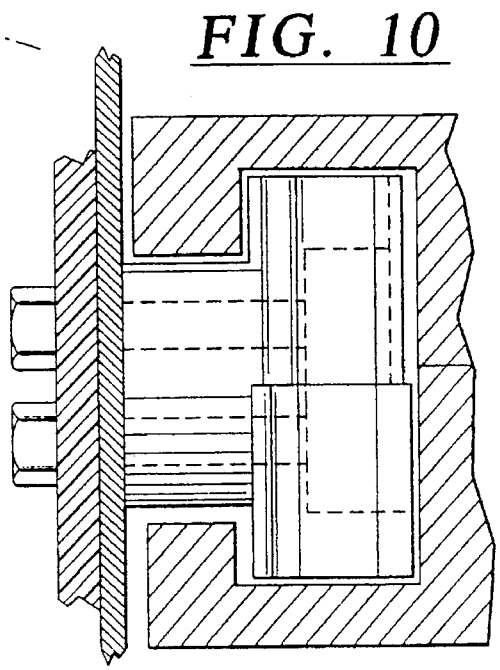
FIG. 10

5,562,201

CONVEYOR ASSEMBLY

This is a continuation of application Ser. No. 08/282,981, filed Jul. 29, 1994, now U.S. Pat. No. 5,460,262.

FIELD OF THE INVENTION

The present invention relates to a conveyor guide assembly. More particularly, the present invention relates to an endless belt conveyor guide assembly for use in transferring containers along a path between processing stations of a packaging machine.

BACKGROUND OF THE INVENTION

Trends within the field of packaging machines point toward increasingly high capacity machines intended for rapid, continuous filling and sealing of a very large number of identical or similar packaging containers, e.g., such as containers of the type intended for liquid contents such as milk, juice, and the like. As these machines have increased in speed and decreased in size, the surrounding apparatus of these smaller more efficient packaging machines have had to be modified to accommodate these higher speeds.

Packaging machines are now known that integrate the various components necessary to fill and seal a container into a single machine unit. This packaging process, generally stated, includes feeding blank cartons (blanks) into the machine, sealing the bottom of the cannons, filling the cartons with the desired contents, sealing the tops of the cartons, and then off loading the filled containers for shipping.

Packaging machines may employ endless rotating conveyors that allow various packaging processes to be performed repeatedly as the conveyor transports the cannons between a plurality of processing stations. These endless rotating conveyors include a plurality of carriers that are located around a conveyor loop. The carriers accept individual cannon blanks that are continuously fed onto the machine by means of an infeeder, and convey them along a processing path to subsequent sealing and filling processing stations.

Increased throughput and decreased size requirements for packaging machines have increased the demands that are placed on the endless belt conveyors that are employed. The increased speed and decreased size of these conveyors increases the forces on the individual components of the conveyor assembly. The stresses on these components tend to cause increased component wear which, in turn, leads to frequent maintenance and a corresponding decrease in the reliability of the machine. This is particularly true along the arcuate portions of the track where the moment forces are larger than on the linear portion.

SUMMARY OF THE INVENTION

A conveyor system is set forth that includes a track having a generally linear section and a generally curved section. The track further includes a guide channel having sidewalls that engage a guide member that is in fixed positional alignment, for example, with a carrier and/or belt. The guide member engages the sidewalls of the guide channel to facilitate guided movement of the carrier and/or belt along the track. The guide member includes a linear portion that is engaged by the track when the guide member is disposed along the linear section of the track while being generally disengaged from the is engaged by the track when the guide member is disposed along the curved section of the track. The guide member further includes a curved section that engages the sidewalls of the guide channel when the guide member is disposed along the curved section of the track. The radius of curvature of the curved portion of the guide member generally coincides with the radius of curvature of the track about a curved portion of the track.

In accordance with one embodiment of the system, the system includes both upper and lower oval-shaped tracks having guide channels with sidewalls that engage upper and lower guide members that are directly affixed to the rear of respective individual carriers. The carriers and guide members are disposed on opposite sides of an endless belt which, in turn, is disposed about the outer periphery of the tracks.

In accordance with one embodiment of the tracks, the tracks may each be comprised of an upper and lower portion. Each of the upper and lower portions have an inner rail and an outer rail, the inner and outer rails being disposed on opposite sides of a respective guide channel portion. The upper portion and lower portion are joined to define the guide channel of the track.

In accordance with one manner of operation of the disclosed conveyor system, the upper portion of the track engages the curved portion of the guide member when the carrier is disposed along the curved section of the track. At that point, the sidewalls of the guide channel portion of the lower portion of the track are generally disengaged from the linear portion of the guide member when the guide member is disposed along the curved section of the track. When the guide member is disposed along the linear portion of the track, the sidewalls of the guide channel portion of the lower portion of the track engages the linear portion of the guide member.

Several conveyor drive mechanisms are contemplated for use with the oval-shaped configuration. In accordance with one type of drive mechanism, a pair of drive wheels are disposed at opposite curved ends of the tracks. The drive wheels frictionally engage the rear surface of the endless belt and drive the belt, carriers, and guides about the tracks.

In accordance with a further type of drive mechanism, a pair of drive wheels are disposed at opposite curved ends of the tracks. The drive wheels include a plurality of uniformly spaced drive grooves. The drive grooves engage drive lugs that may, for example, be affixed to the carriers. For example, each carrier may include upper and lower guide members disposed respectively at the upper and lower portions of the carrier. A drive lug may extend between and connect the upper and lower guide members.

The foregoing conveyor system construction provides an endless rotating conveyor that minimizes the force and wear exerted on the conveyor belt and the wear components thus prolonging the lifespan of the system and reducing its mean time between failures. The construction further provides a conveyor system for a machine, such as a packaging machine, wherein the container carrier is affixed to the conveyor band on the opposite side of the wear parts, such as the guides and tracks, to prevent contamination of the containers on the carriers.

BRIEF DESCRIPTION OF THE DRAWINGS

FIG. 7 is perspective view of a conveyor guide member.

FIG. 8 is a view of the conveyor guide of FIG. 7 as viewed from the inside of the band.

FIG. 9 is a cross-sectional view of the conveyor guide member positioned in a linear section of the track as taken along the lines 9—9 in FIG. 1.

FIG. 10 is a cross-sectional view of the conveyor guide member positioned in the curved portion of the track as taken along the lines 11—11 in FIG. 1.

FIG. 11 is a cross-sectional view of the conveyor guide member along the lines 11—11 in FIG. 7.

DETAILED DESCRIPTION OF THE DRAWINGS

Figure 1:
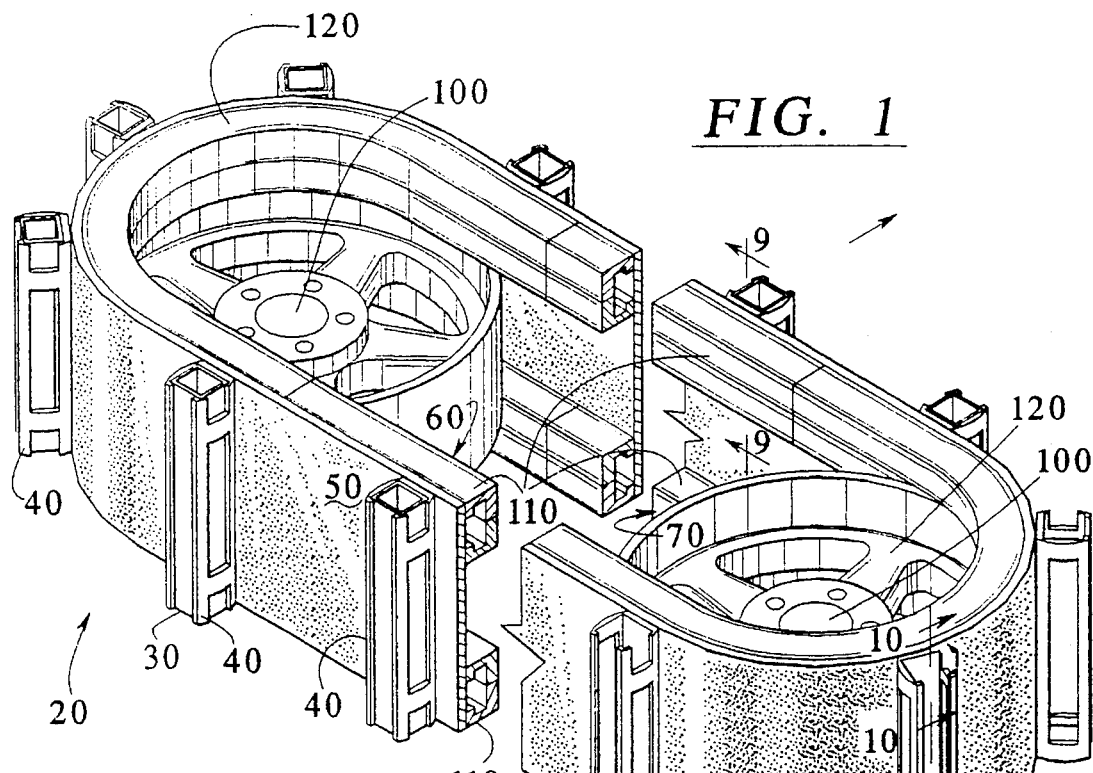
FIG. 1 is a perspective view of one embodiment of an endless loop conveyor system illustrating its components, including a plurality of carriers holding cannon blanks.

A conveyor assembly 20 is illustrated in FIG. 1. Such a conveyor assembly 20 is suitable for use, for example, in a packaging machine such as the one disclosed in U.S. Ser. No. 08/190,546, filed Feb. 2, 1994, (TPR-940) which is hereby incorporated by reference. The conveyor assembly 20 may be used to transfer carton blanks 30 along a generally oval processing path in which the carton blanks 30 are sealed and/or filled.

The conveyor assembly 20, as illustrated in the embodiment shown in FIG. 1, is of an endless loop type and includes a plurality of carriers 40 for holding canon blanks 30, a conveyor band 50, an upper track 60, a lower track 70, a plurality of upper guide members 80 disposed within the upper track 60, a plurality of lower guide members 90 disposed within the lower track 70, and two drive wheels 100.

The upper and lower tracks 60 and 70 of the illustrated embodiment are of a generally oval shape and include linear sections 110 and curved end sections 120. The upper and lower tracks 60 and 70 are disposed parallel to one another. An endless band 50 extends about the outer periphery of the tracks 60 and 70, the ends of the band being joined, for example, in the manner illustrated in FIGS. 2A–E.

Figure 2A:
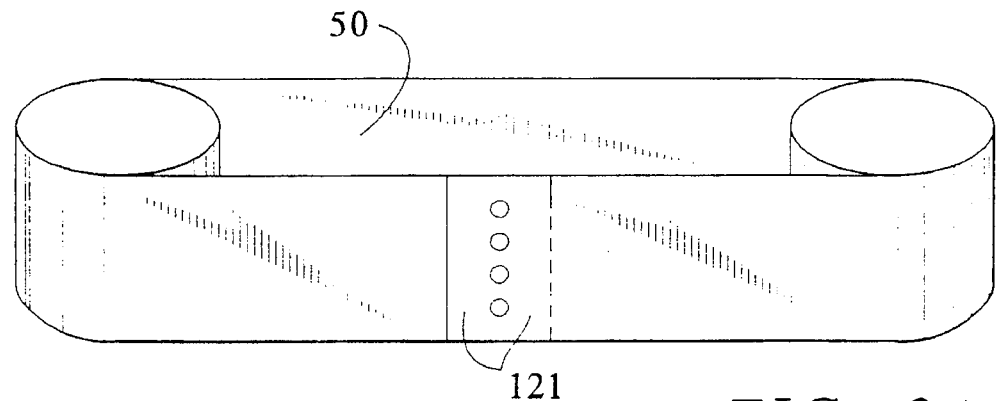
FIGS. 2A–E illustrate one manner in which the ends of the conveyor belt may be joined.
Figure 2B:
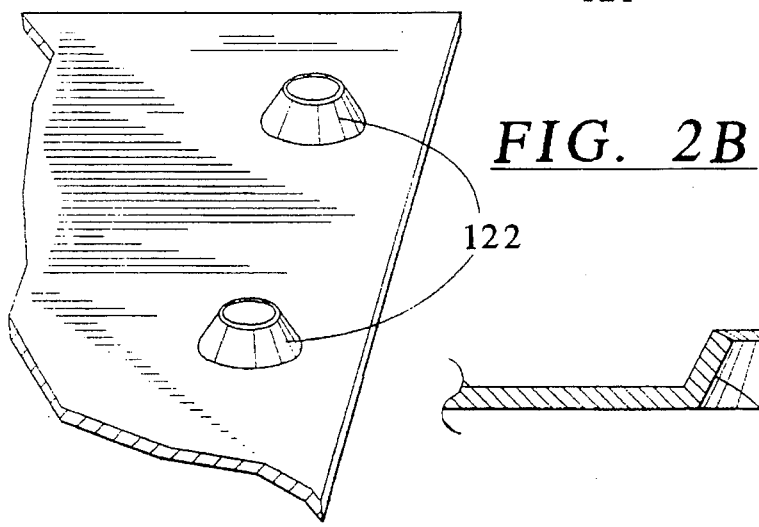
Figure 2C:
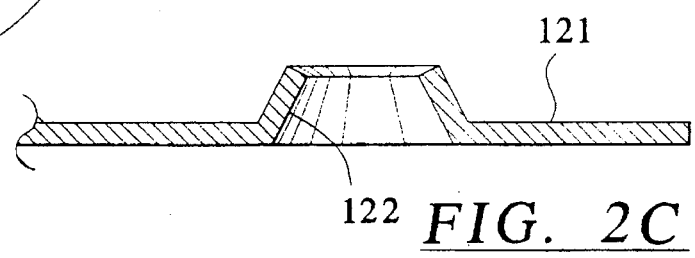
Figure 2D:
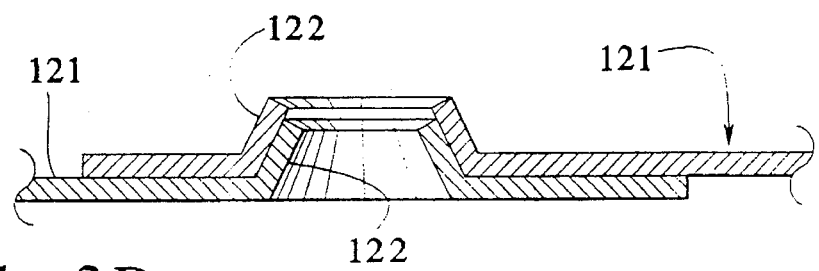
Figure 2E:
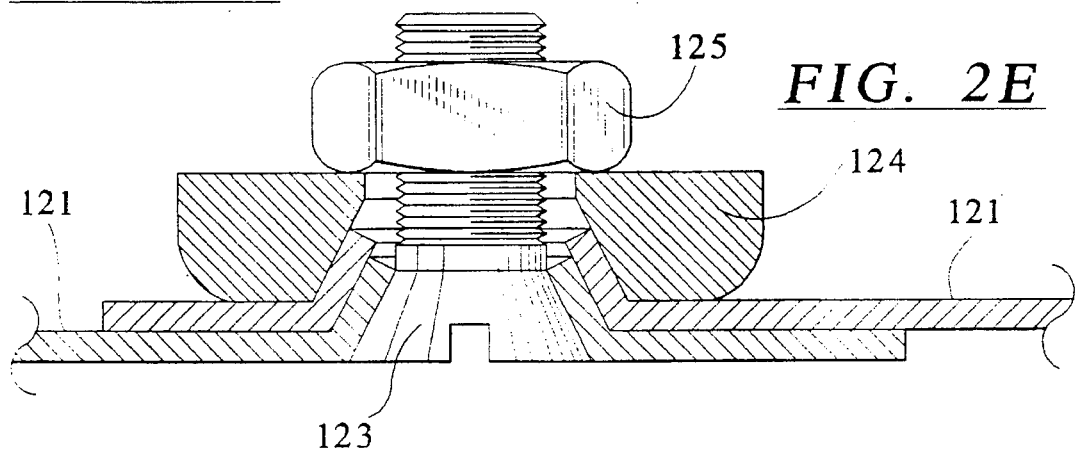

As illustrated, the ends 121 of the band 50 are joined at a splicing section 122. Each end 121 has a plurality of conical apertures 122 which, as illustrated in FIG. 2D, overlie one another when the belt ends 121 are fastened to one another with, for example, a bolt 123, washer 124, and nut 125. By joining the band ends in the illustrated manner, the joined sections of the band remain relatively flat and do not exhibit the overlapped protrusions characteristic of other such joints.

Figure 3:
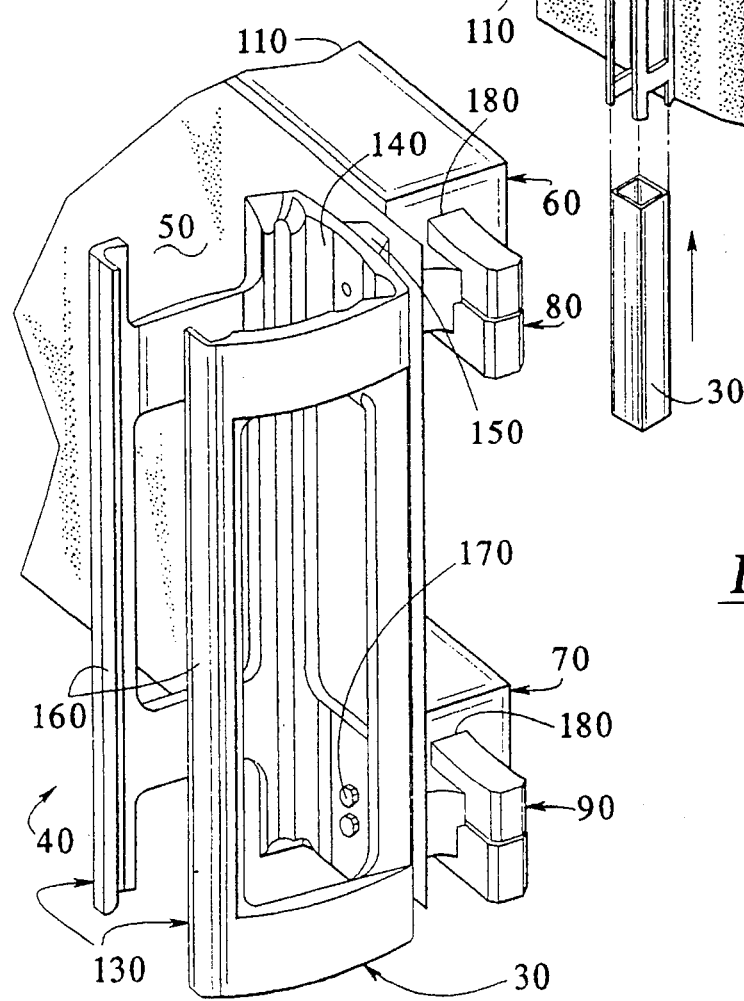
FIG. 3 is a perspective view of a carrier and its respective conveyor guide members.

As shown in FIG. 3, each carrier 40 has a pair of projecting arms 130 that extend generally perpendicular from the band 50, a carrier back 140 that is aligned generally parallel to the band 50, and a rear support bar 150 that rests on the band 50' and separates the carrier back 140 from the band 50. The projecting arms 130 are spaced apart to form a compartment therebetween for accommodating the packaging container blanks 30. The projecting arms 130 each have a support 160 located at the outer most portion of the arms. The supports 160 extend toward one another for gripping the outwardly facing corners of the packaging cannons. Each carrier 40 is rigidly attached to the conveyor band 50 by bolts 170, screws, or the like which extend through the carrier back 140, the rear support bar 150, the band 50, and into the conveyor guide members 80,90. The carriers 40 are separated from the wear parts (here, the tracks 60,70 and the guide members 80,90) by the band 50 thus reducing the chances for contamination of the contents of the cannon blanks 30 carded by the carrier 40. Alternatively, the carriers 40 can comprise T-shaped arms that are spaced uniformly around the band 50 such that the front of one arm and the rear of the next arm form a space therebetween for accommodating the packaging container blanks 30. Other carrier types are also suitable for use with the illustrated system.

Each carrier 40 is in fixed positional alignment with a guide member 80 positioned in the upper track 60 and a guide member 90 positioned in the lower track 70. For example, the guide members 80 and 90 may be rigidly attached to the rear of the respective upper and lower portions of the carrier 40. The upper and lower tracks 60 and 70 define guide channels 180 in which the guide members 80 and 90 are disposed to facilitate guided movement of the guide members 80, 90 about the tracks.

Figure 4:
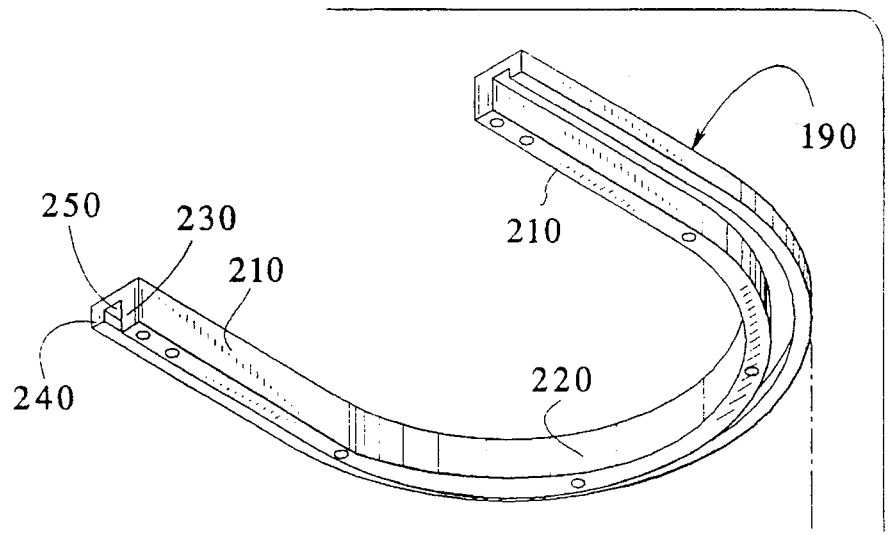
FIG. 4 is a perspective view of a segment of the top and bottom portions of a track.
Figure 4:
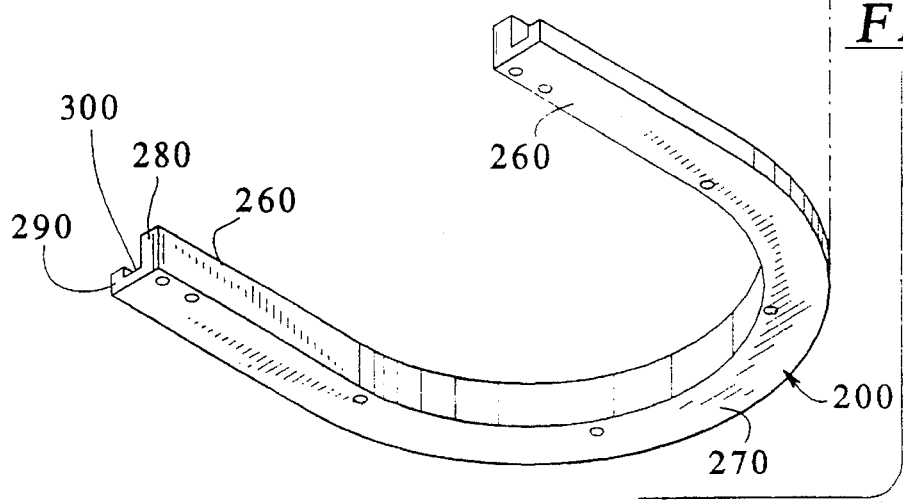
Figure 5:
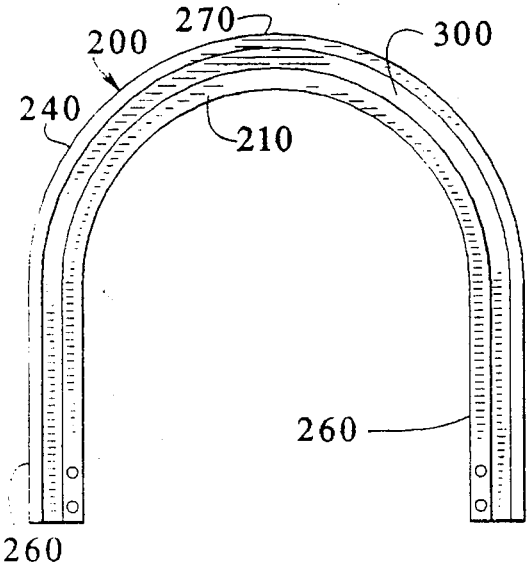
FIG. 5 is a top view of a segment of the bottom portion of the track.
Figure 6:
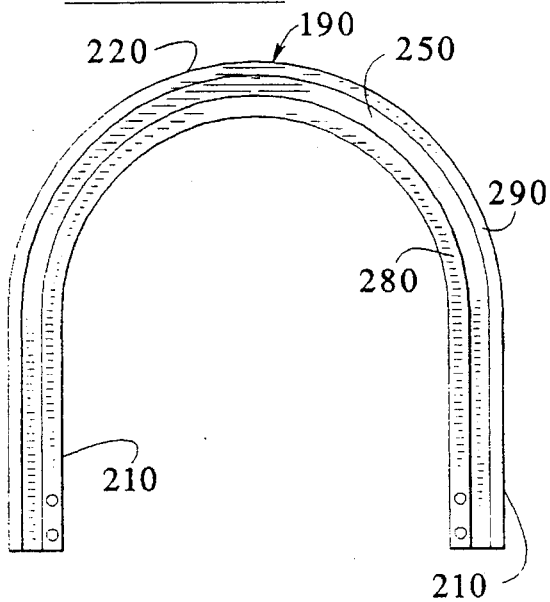
FIG. 6 is a top view of a segment of the top portion of the track.

FIGS. 4–6 illustrate the components that comprise the upper and lower tracks 60 and 70. For purposes of convenience only, the portion of track shown in FIGS. 4, 5, and 6 will be referred to as the upper track 60. All references to the structure and components of the upper track 60, however, are equally applicable to the lower track 70, as they may, if desired, be identically constructed, differing only in their respective locations.

The upper track 60, has an upper portion 190 and a lower portion 200 and, for example, may be constructed from stainless steel or the like. The upper portion 190 has linear sections 210 and an arcuate section 220. The upper portion of track 60 also includes an inner rail 230 and an outer rail 240 that define a guide channel portion 250. Correspondingly, the lower portion 200 of track 60 has linear sections 260, an arcuate section 270, and an inner rail 280 and outer rail 290 that define a lower guide channel portion 300.

The upper track 60 is assembled by attaching the upper portion 190 to the lower portion 200 such that the linear sections 210 and the arcuate section 220 of the upper portion 190 of track 60 overlie the linear sections 260 and the arcuate section 270 of the lower portion 200 of track 60. The upper and lower portions of track 190,200 are affixed to each other, for example by bolts, screws, or the like. When joined, the guide channel portions 250 and 300 are aligned to form the complete guide channel 180 (FIG. 3).

As shown in FIGS. 5 and 6, the guide channel portion 250 of linear sections 210 of the upper portion 190 of track 60 and the guide channel portions 300 of the linear sections 260 of the lower portion 200 of track 60 have the same widths, while the arcuate sections 220 and 270 have different widths. The outer rail 240 of the lower portion 200 of track 60 decreases in width around the arcuate section 270 so that the lower guide channel portion 300 of the lower portion 200 of track 60 is wider around the arcuate section 270 than it is through its linear sections 260. The outer rail 290 of the upper portion 190 of track 60 has the same width around the arcuate section 220 as it does in the linear sections 210. Thus, the guide channel portion 250 has the same width throughout the entire upper portion of track 60. Alternatively, the guide channel portion 250 may be, for example, wider along linear sections 210 that is at the curved section 220.

As may readily be recognized, the upper portion 190 of track 60 and the lower portion 200 of track 60 can be inverted without detriment to the operation of the conveyor assembly 20. A corresponding inversion of the guide members 80 would also be required in such an instance.

FIGS. 7–11 illustrate one embodiment of a guide member 80 suitable for use in the presently described conveyor assembly 20. The guide members 80, for example, may be manufactured from a polymer such as ultra high molecular weight polyethylene (UHMW). As shown in FIG. 1, an upper guide member 80 and lower guide member 90 are attached to each carrier 40 at respective upper and lower portions thereof The guide members 80,90 may be of identical size, shape, and structure. Each guide member 80,90 sits in the respective guide channel 180 formed in the completed track assemblies 60,70. Each guide member 80,90 has an upper portion 310, a lower portion 320, a neck 330, and a cavity 340.

The lower portion 320 of the guide 80 has a generally flat inner surface 345 and a generally flat outer surface 350. The upper portion 310 of the guide 80 has a concave inner surface 360 and a convex outer surface 380 so as to generally conform to the radius of the guide channel of the arcuate portion 220 of upper portion 190 of the track 60.

The neck 330 protrudes from the outer surface of the guide member 80 through a gap between outer rails 240,290 and into contact with the backside of the conveyor band 50. The guide member 80 is attached to the rear support bar 150 of the respective carrier 140 by means of a bolt, screw of the like 390 that extends through the band 50 to rigidly attach the carrier 140 to the guide member 80. When a bolt fastener is used, the end of the bolt 390 and a securing nut 395 rest in the cavity 340, such that neither the bolt 390 nor nut 395 will not contact the track 60 as the guide members 80 travel trough the guide channel 180.

As shown in FIGS. 9 and 10, the guide member 80 rests in guide channel 180. FIG. 9 is a cross-sectional view illustrating a guide member 80 as it travels through the linear section 110 of the upper track assembly 60. While the guide member 80 is traveling through the linear section 110 of the upper track 60, the inner and outer rails 280 and 290 of the lower track portion 200 enact as guides for the guidemember 80 by engaging the lower section 320 of the guide member 80. The upper portions of the guide member 80 need not be in contact with the upper portion 190 of the track 60 while the guide member 80 travels through the linear section 110 of the upper track 60.

FIG. 10 is a cross-sectional view of the track illustrating a guide member 80 as it travels through the arcuate section 120 of the upper track assembly 60. As the guide members travel from the linear section 110 of the upper track assembly 60, to the arcuate section 120 of the upper track assembly 60, inertia forces urge the convex surface of the upper section 310 of the guide member 80 against the outer rail 240 of the track 60. The convex outer surface of the guide member 80 may also contact the outer rail 240 of the upper portion 190 of the track 60. In the illustrated embodiment, the radius of the concave inner surface conforms to the radius of the inner rail 230 of the upper portion 190 of the track 60 and the radius of the convex outer surface conforms to the radius of the outer rail 240 of the upper portion 190 of track 60.

Since the lower guide channel portion 300 widens around its arcuate portion 270, the lower section of the guide member 80 is, for example, disengaged from contact with the inner and outer rails 280 and 290 as the guide member 80 travels around the arcuate portion 120 of the track 60. The upper section 310 of the guide member 80 thus functions, through engagement with the track 60, as the principal guide for movement about the curved sections of the track 60.

The guide members 80,90 facilitate transfer of the moment forces of the carriers 140 to the tracks 60,70 instead of to the band 50. The wear on the band 50 is thus reduced, providing the potential to increase its longevity and mean time between failures.

It should be understood that the orientation of the guide members can be changed such that the lower portion of the guide has a concave inner surface and a convex outer surface, and the upper portion of the guide has a flat inner surface and a flat outer surface. However, if this orientation is to be utilized, the orientation of the upper and lower portions of the track should also be reversed.

Several different drive mechanisms are suitable for use in the illustrated conveyor assembly 20. Two such drive mechanisms are illustrated in FIGS. 12–14.

Figure 12:
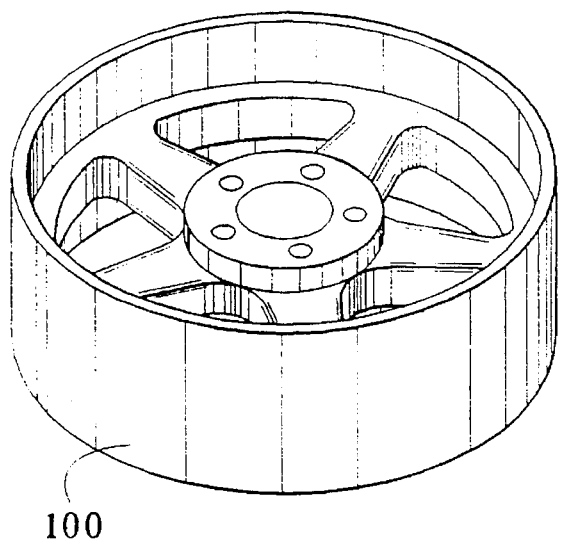
FIG. 12 is a perspective view of one embodiment of a drive wheel for driving the conveyor system illustrated in FIG. 1.

FIG. 12 illustrates a drive wheel 100 in accordance with one drive mechanism embodiment. The drive wheel 100 is a friction wheel that, for example, may be driven by a high speed, low torque servo motor. The wheels 100 frictionally engage the rear portion of the band 50 and drive the band 50 to move the carriers 40 and guide members 80, 90 around the tracks 60,70. Alternatively, an electric motor or the like may be used to drive the wheels 100. If a low torque servo motor is employed, a gearing mechanism may be included to increase the torque applied to the drive wheels 100.

Figure 13:
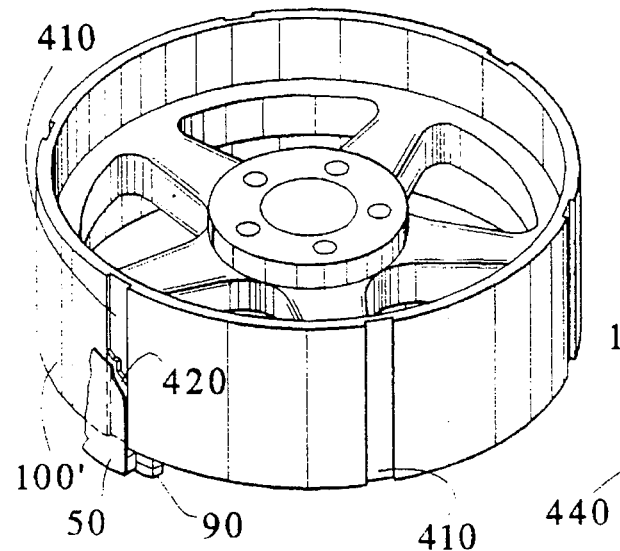
FIG. 13 is a perspective view of another embodiment of a drive wheel for driving the conveyor system illustrated in FIG. 1.

FIG. 13 illustrates another embodiment of a drive wheel suitable for use in the illustrated conveyor assembly 20. The drive wheel 100 includes a plurality of uniformly spaced grooves 410 along the outer surface of the wheel 100. The drive wheels 100 may, for example, be driven by a high speed, low torque motor (not shown) with a gear reducer to increase the applied torque.

Figure 14:
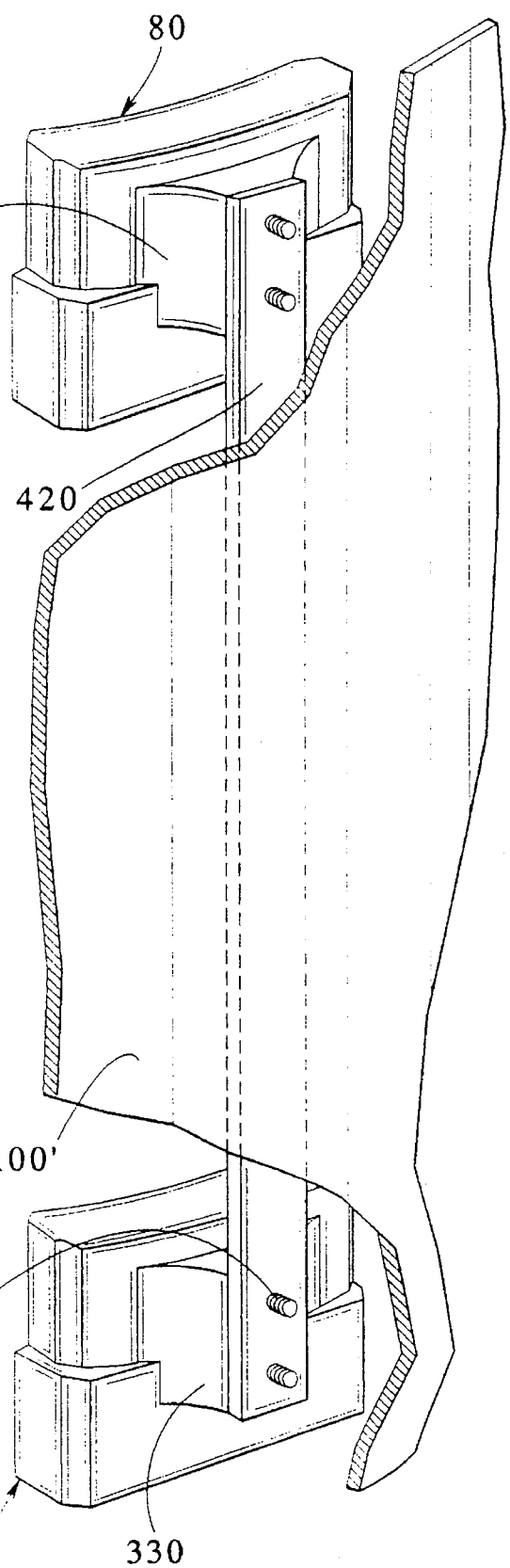
FIG. 14 is a perspective view of a positive drive lug disposed between the upper and lower conveyor guide members for use with the drive wheel of FIG. 13.

FIG. 14 illustrates the manner in which the drive wheel 100 may engage the other portions of the conveyor assembly 20 to drive the carriers 40 along the processing path. As illustrated, the guide members 80 and 90 associated with, for example, each carrier 40 are connected to each other through the use of a positive drive lug 420 so that the carriers 140 can be driven by the lug 420 as opposed to frictional forces between the wheels 100 and the backside of the band 50. The drive lug connected to the neck 330 of the upper guide member 80 at a first end 430, and to the neck 330 of the lower guide member 90 at a second end 440. The lug 420 is affixed to the guide members 80,90, for example, by bolts 36 which extend from the respective carrier 140, through the band 50, through the lug 420 before being affixed by a nut in the cavity of the respective guide member 80,90. As the lugs 420 are located against the rearside of the band 50, the grooves 410 in the wheel 100, which are uniformly spaced about the wheel 100 to coincide with the distance between each lug 420, engage each lug to drive the carriers 140 around the conveyor system 20.

While preferred embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, all changes and modifications which come within the meaning and range of equivalency of the claims are intended to be embraced herein.

We claim as our invention:

1. A method for conveying a container along a track having a linear portion and a curved portion, the track having a channel, the channel being linear in the linear portion of the track and curved in the curved portion of the track, the method comprising the steps of:

providing a carrier supporting the container;

providing a guide member in fixed positional alignment with the carrier and engaging the channel of the track;

moving the carrier and guide member along the channel of the track;

guiding the guide member within the channel along the linear portion of the track with a generally linear portion of the guide member;

guiding the guide member along the curved portion of the track with a generally curved portion of the guide member.

2. A method for conveying a container along a track having a linear portion and a curved portion, the method comprising the steps of:

providing a carrier supporting the container;

providing a guide member in fixed positional alignment with the carrier and engaging the track;

moving the carrier and guide member along the track;

guiding the guide member along the linear portion of the track with a first portion of the guide member specifically adapted for engagement with the linear portion of the track;

guiding the guide member along the curved portion of the track with a second portion of the guide member specifically adapted for engagement with the curved portion of the track.

3. A method for conveying a container along a track having a linear portion and a curved portion, the track having a channel, the channel being linear in the linear portion of the track and curved in the curved portion of the track, the method comprising the steps of:

providing a carrier supporting the container;

providing a guide member in fixed positional alignment with the carrier and engaging the channel of the track;

moving the carrier and guide member along the channel of the track;

maintaining the guide member within the linear channel as the carrier and guide member are moved along the track by causing engagement between sidewalls of the linear channel and a generally linear portion of the guide member;

maintaining the guide member within the curved channel as the carrier and guide member are moved along the track by causing engagement between sidewalls of the curved channel and a generally curved portion of the guide member;

* * * * *

UNITED STATES PATENT AND TRADEMARK OFFICE
CERTIFICATE OF CORRECTION

PATENT NO. : 5,562,201
DATED : October 8, 1996
INVENTOR(S) : Paul Kennedy and Peter Schoenecker Page 1 of 2

It is certified that error appears in the above-indentified patent and that said Letters Patent is hereby corrected as shown below:

IN COLUMN 1, LINE 29

Cancel "cannons" and insert --cartons-- therefor.

IN COLUMN 1, LINE 35

Cancel "cannons" and insert --cartons-- therefor.

IN COLUMN 1, LINE 39

Cancel "cannon" and insert --carton-- therefor.

IN COLUMN 2, LINE 65

Cancel "cannon" and insert --carton-- therefor.

IN COLUMN 1, LINE 67

Cancel "is engaged by the"

IN COLUMN 3, LINE 43

Cancel "canon" and insert --carton-- therefor.

IN COLUMN 4, LINE 10

Cancel "cannons" and insert --cartons-- therefor.

UNITED STATES PATENT AND TRADEMARK OFFICE
CERTIFICATE OF CORRECTION

PATENT NO. : 5,562,201
DATED : October 8, 1996
INVENTOR(S) : Paul Kennedy and Peter Schoenecker It is certified that error appears in the above-indentified patent and that said Letters Patent is hereby corrected as shown below:

IN COLUMN 4, LINE 17

Cancel "cannon" and insert --carton-- therefor.

Cancel "carded" and insert --carried-- therefor.

IN COLUMN 5, LINE 22

After "thereof" insert --.--

Signed and Sealed this

Seventh Day of January, 1997

Attest:

BRUCE LEHMAN

Attesting Officer     Commissioner of Patents and Trademarks